(12) United States Patent
Evans et al.

(10) Patent No.: US 8,367,921 B2
(45) Date of Patent: Feb. 5, 2013

(54) METHOD AND SYSTEM FOR ASSESSING A MUSICAL PERFORMANCE

(75) Inventors: David Evans, South Australia (AU); Benjamin Ruciak, South Australia (AU); William Thorpe, Northcote (NZ)

(73) Assignee: Starplayit Pty Ltd, Adelaide (AU)

( * ) Notice: Subject to any disclaimer, the term of this patent is extended or adjusted under 35 U.S.C. 154(b) by 0 days.

(21) Appl. No.: 11/568,265

(22) PCT Filed: Jan. 31, 2005

(86) PCT No.: PCT/AU2005/000105
§ 371 (c)(1),
(2), (4) Date: Oct. 25, 2006

(87) PCT Pub. No.: WO2006/042358
PCT Pub. Date: Apr. 27, 2006

(65) Prior Publication Data
US 2007/0256543 A1 Nov. 8, 2007

(30) Foreign Application Priority Data
Oct. 22, 2004 (AU) ................. 2004906097

(51) Int. Cl.
*G04B 13/00* (2006.01)
(52) U.S. Cl. .......................... 84/609; 84/612
(58) Field of Classification Search ............ 84/600–607, 84/609–614, 622–625, 634–638, 649–654, 84/659–661, 666–669, 470 R, 477 R; 434/307 A, 434/307 R
See application file for complete search history.

(56) References Cited

U.S. PATENT DOCUMENTS

| | | | |
|---|---|---|---|
| 5,227,574 A | 7/1993 | Mukaino | |
| 5,254,803 A | 10/1993 | Terao | |
| 5,557,056 A | 9/1996 | Hong et al. | |
| 5,952,597 A | 9/1999 | Weinstock et al. | |
| 6,107,559 A | 8/2000 | Weinstock et al. | |
| 6,166,314 A * | 12/2000 | Weinstock et al. | 84/483.1 |
| 6,417,435 B2 | 7/2002 | Chantzis et al. | |
| 6,541,692 B2 * | 4/2003 | Miller | 84/634 |
| 6,660,922 B1 * | 12/2003 | Roeder | 84/477 R |
| 6,751,439 B2 | 6/2004 | Tice et al. | |
| 7,164,076 B2 | 1/2007 | McHale et al. | |
| 2001/0029830 A1 * | 10/2001 | Rosen | 84/478 |

(Continued)

FOREIGN PATENT DOCUMENTS

| | | |
|---|---|---|
| CA | 2357291 | 3/2003 |
| EP | 1465150 | 10/2004 |

(Continued)

*Primary Examiner* — Christopher Uhlir
(74) *Attorney, Agent, or Firm* — Greenblum & Bernstein, P.L.C.

(57) ABSTRACT

The invention relates to a method and system for assessing a performance of a musical composition in relation to a model performance of the same composition. In particular, as even a model performance does not follow a score of a composition precisely, the present invention initially correlates the model performance to a score of the performed composition. This allows for an accurate assessment of the timing of the assessable performance, relative to the timing of the model performance. The invention is of particular use where the assessable performance is performed along with the model performance, but the two performances are remote from each other.

28 Claims, 8 Drawing Sheets

U.S. PATENT DOCUMENTS

| | | | |
|---|---|---|---|
| 2001/0032539 A1* | 10/2001 | Chantzis et al. | 84/478 |
| 2001/0039870 A1* | 11/2001 | Shimaya et al. | 84/478 |
| 2002/0004191 A1* | 1/2002 | Tice et al. | 434/350 |
| 2002/0165921 A1* | 11/2002 | Sapieyevski | 709/204 |
| 2003/0014262 A1* | 1/2003 | Kim | 704/278 |
| 2004/0123726 A1* | 7/2004 | Kato et al. | 84/609 |
| 2004/0196747 A1 | 10/2004 | Jung et al. | |
| 2004/0221707 A1* | 11/2004 | Hiratsuka et al. | 84/478 |

FOREIGN PATENT DOCUMENTS

| | | |
|---|---|---|
| WO | 98 58346 | 12/1998 |

* cited by examiner

METHOD AND SYSTEM FOR ASSESSING A MUSICAL PERFORMANCE

FIELD OF THE INVENTION

The invention relates to the field of music, particularly software that allows the interaction of a live performer with a processing device which delivers feedback and accompaniment.

BACKGROUND OF THE INVENTION

Learning a musical instrument has always been a difficult and sometimes tedious task. All children are given the option to learn an instrument, with most giving up well before they become proficient. Lack of sufficient motivation is a key reason that music practice stops.

It has been recognised by music teachers, that giving students the chance to play inside a professional ensemble prior to them reaching a professional standard, increased their motivation remarkably and provided them with the necessary feedback to become proficient at playing their instrument.

The problem with this is that access to professional ensembles for budding musicians is severely limited due to cost, location and availability. There is a need to recreate such an environment in a manner convenient to the student.

SUMMARY OF THE INVENTION

In a first aspect of the present invention, there is accordingly provided a method for assessing an assessable performance of a played part of a musical composition by a musician comprising:

(a) receiving input of a model performance of one or more parts of the musical composition;
(b) determining the position of the model performance within a score of at least the played part of the musical composition;
(c) receiving input of the assessable performance;
(d) determining one or more expected characteristics of the assessable performance based on the position of the model performance within the score, for the played part; and
(e) comparing at least one of the one or more expected characteristics to the corresponding characteristic of the input of the assessable performance to make an assessment of the assessable performance.

In this specification, a score is taken to be any representation of a musical composition. A score may, for example, be in the format of stave notation, a lexical format such as MusicXML, or a purely digital representation. Preferably, it is a digital representation imported from a file in an XML format, such as MusicXML or the MusicMatrix format described later in this document. The appropriate section of the score can then be displayed to the musician, if desired, in stave notation. Note that MusicXML is owned by and copyright of Recordare LLC.

The score used by this method may include all or only some of the parts of the musical composition. However, it will necessarily include at least the played part, in order to provide the information necessary to determine the expected characteristics of the assessable performance.

The input of the model performance could be any information regarding the model performance. However, it preferably includes both audio and video input of the model performance, as well as position input identifying the position of the model performance in the score at any given time. The position input can simply be beat markers received at the time of the corresponding beat in the score, preferably at each beat, and preferably each beat marker identifies the particular beat that it marks. Clearly, if the input of the model performance includes position input, then this position input will be used to determine the position in the musical score. However, any means for accomplishing this may be used. For instance, U.S. Pat. No. 6,166,314 discloses a different means for determining the position of a performance in a score. Of course, it is usually not possible to accurately determine the position of the model performance 11 in the score purely by using a timer from the beginning of the model performance 11. As those skilled in the art would be well aware, no two performances of a composition are ever the same. A model performance—for example by an orchestra—will generally vary to some degree from the precise tempo assigned by the score.

Ideally, output of the model performance is provided to the musician, from the received input, as the musician performs the assessable performance. This means that the musician can play along with audio and/or video of the model performance. The position within in the score can also be used, for example, to display the appropriate sheet music of the played part, in stave notation, for the musician to follow as they play along with the model performance.

The method preferably further comprises displaying the assessment to the musician. The method may also include providing feedback to the musician on how to improve their playing, based on the assessment. Either of these steps may be accomplished by means of text, audio or graphical display. They may inform the first musician of any mistakes, may provide encouragement, or may assist them to correct any mistakes.

The model performance and the assessable performance may be remote from each other in time and/or space. Indeed, the present invention is well suited to the situation where the two performances occur together in real-time, but in remote locations.

Although the present invention can be used in a wide range of scenarios, it is also well suited to situations where the model performance is performed by an orchestra. The orchestra will perform many, if not all, parts of a musical composition. The musician can then play their chosen part—the played part—along with the model performance by the orchestra, and this playing constitutes the assessable performance. The musician may play any instrument, including voice, for which there is an appropriate part in the musical composition.

The present invention does not require an electronic instrument with a MIDI or other interface to process the assessable performance. If a real musical instrument is used (as opposed to a MIDI instrument) in conjunction with recording apparatus such as a microphone, a frequency recognition engine can be used to receive input of characteristics such as the pitch, volume and timbre of the notes that the musician plays. These characteristics would then be compared to the corresponding expected characteristics (based on the position in the score, for the played part) in order to make an assessment of the assessable performance. Ideally, this assessment should include an assessment as to the timing of the assessable performance relative to the model performance.

In a second aspect of the present invention, there is provided a system for assessing an assessable performance of a played part of a musical composition by a musician comprising:

a first receiver for receiving input of the assessable performance;

a second receiver for receiving input of a model performance of the musical composition;

a locator for determining the position of the model performance within a score of at least the played part of the musical composition, from the input received by the second receiver;

a predictor for determining at least one expected characteristic of the assessable performance, based on the position in the musical score, for the played part; and a comparer for comparing at least one characteristic of the input of the assessable performance to the corresponding expected characteristic to make an assessment of the assessable performance.

Since the assessable performance and the model performance may occur at locations which are remote from each other, data will generally need to be transferred from at least one of these locations in order to accomplish several of the essential and preferred steps described above. This data may be sent over a computer network such as the Internet. Typically, since the musician will usually wish to play along with the model performance, the system will receive the input of the model performance at the location of the assessable performance. To this end, data can be sent from a computer at the location of the model performance and is then received as input of the model performance by a computer at the location of the assessable performance. Preferably, this input is received in the form of a media file containing audiovisual content of the model performance, which can be in a streaming format. In this circumstance, the position information is preferably encoded into the media file.

However, since the model and assessable performances are not necessarily concurrent, the model performance may have been pre-recorded. Therefore, although the media file may still be received in a streaming format, it would also be possible to receive the input of the model performance as a whole—for instance, it could be downloaded from the Internet before the musician begins performing the assessable performance.

In further aspects of the present invention, there is also provided a computer readable medium and computer program element for directing a programmable device to perform the steps of the above method.

BRIEF DESCRIPTION OF THE DRAWINGS

An illustrative embodiment of the present invention will be discussed with reference to the accompanying drawings wherein.

DESCRIPTION OF A PREFERRED EMBODIMENT OF THE INVENTION

Figure 1:
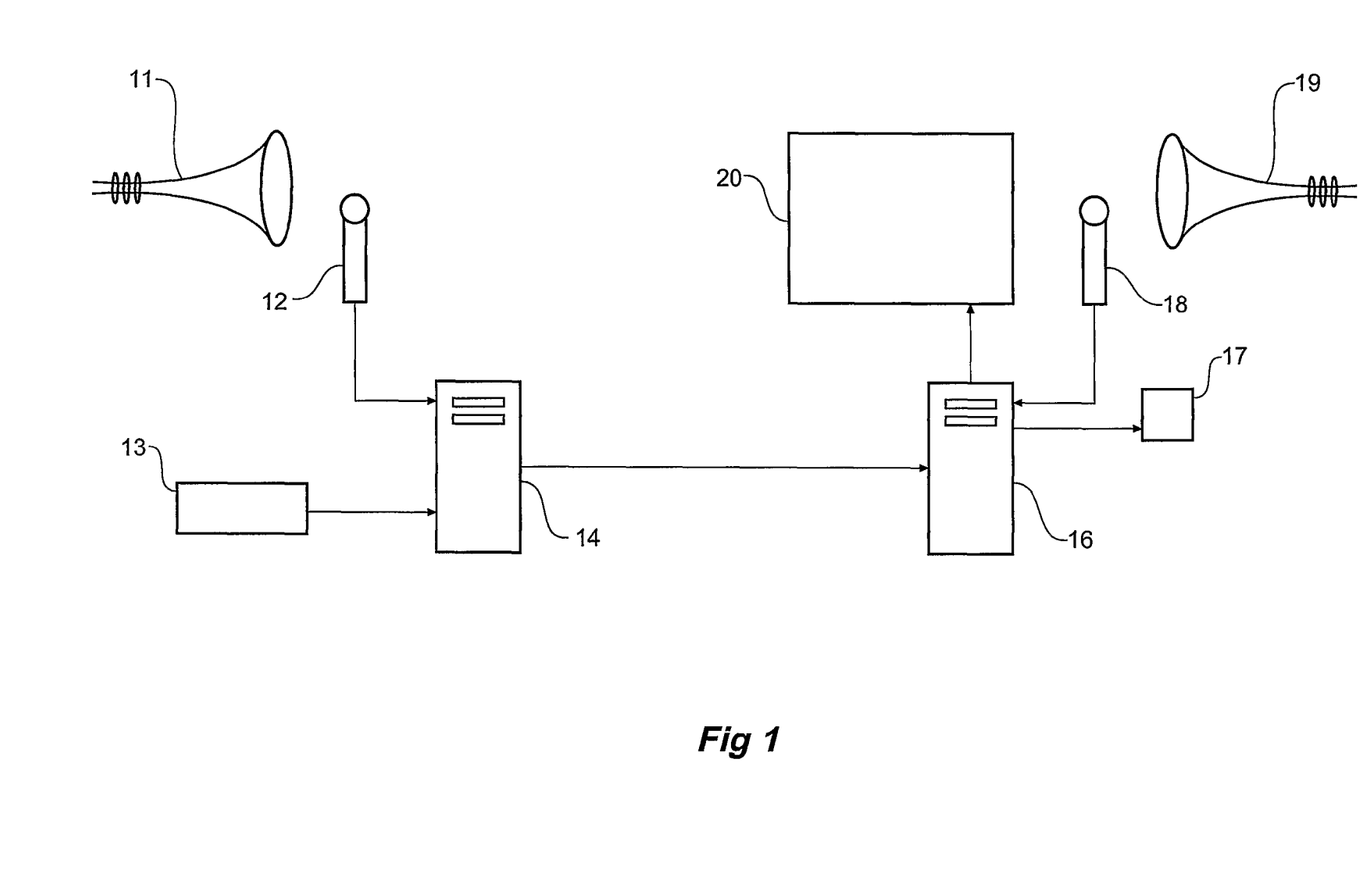
FIG. 1 is an overall diagram of a preferred embodiment of the present invention.

FIG. 1 shows an overall system according to a preferred embodiment of the invention, whereby a model performance 11 of a musical composition is recorded using audio and/or visual recording devices 12, typically a video camera and microphone. The audio and/or visual features of the performance are encoded into a media file by a computer 14. Timing information is provided by beat markers, generated in this embodiment by keystrokes on a keyboard 13 at the appropriate time for each beat. The timing information is typically encoded into the media file, which is then transmitted across a computer network 15 to a user's personal computer 16. The user's computer 16 is connected to an audio recording device 18, which receives audio input of an assessable performance 19 (typically by the user) of a played part of the musical composition, and delivers input of the assessable performance to the user's computer 16. The user's computer 16 is also connected to audio 17 and video 20 output devices. The audio output device(s) 17 emit the audio features of the media file, containing the model performance 11. The video output device 20 is used to display several features based on both the model performance 11 and the assessable performance 19.

Figure 2:
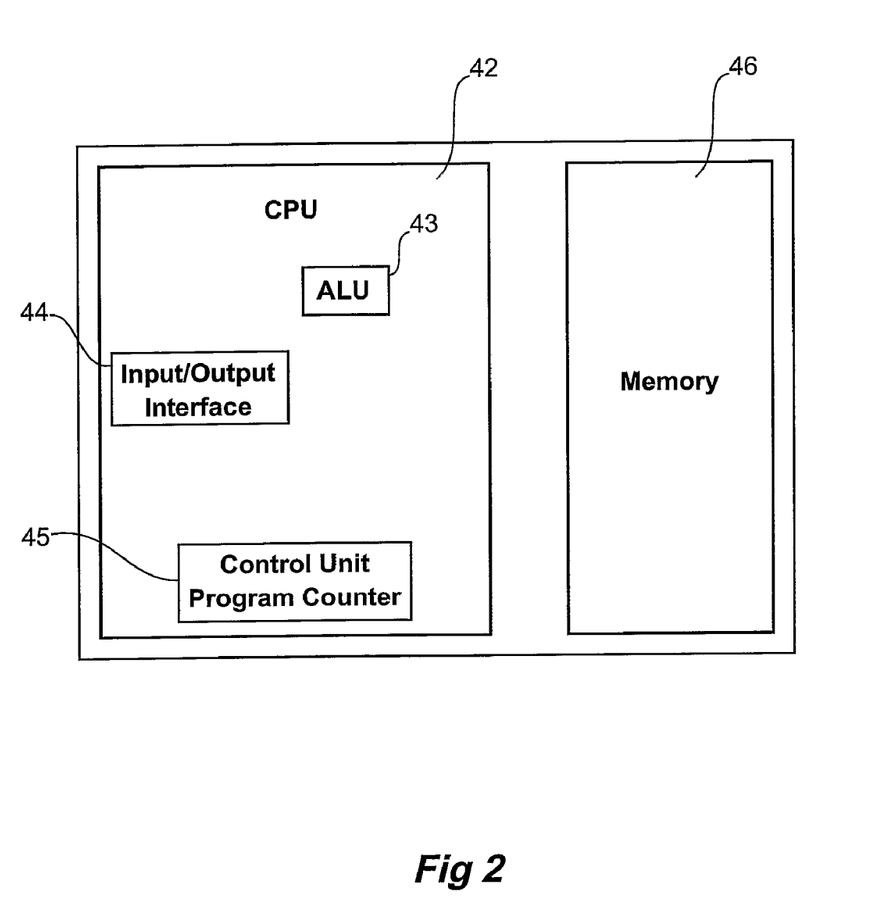
FIG. 2 is a general diagram of a computer architecture which could be used to implement the present invention.

Both computers 14,16 will typically operate broadly under the architecture shown in FIG. 2, wherein a central processing unit (CPU) 42, containing an Input/Output Interface 44, an Arithmetic and Logic Unit (ALU) 43 and a Control Unit and Program Counter element 45 is in communication with input and output devices through the Input/Output Interface 44, and a memory 46.

Figure 3:
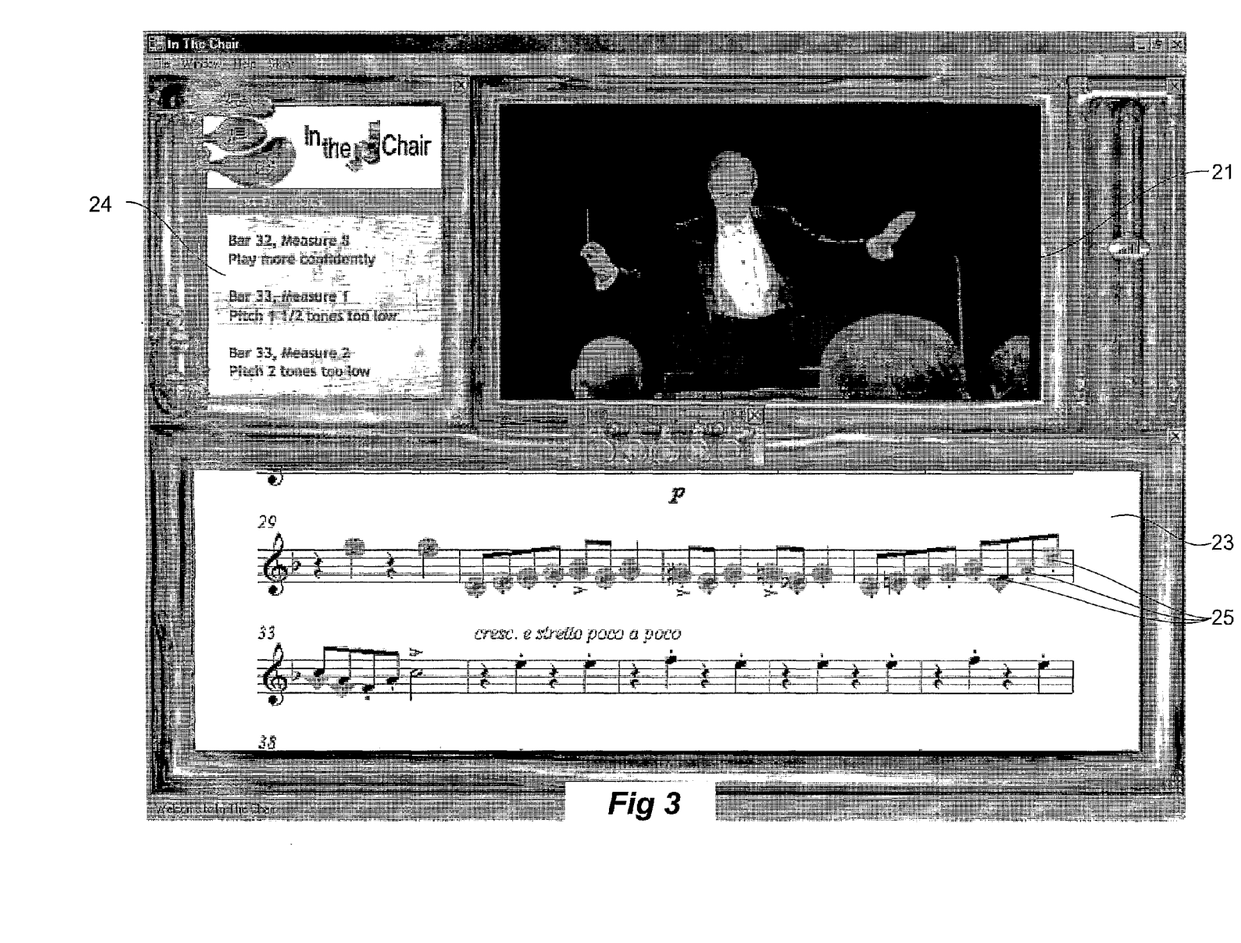
FIG. 3 is a screenshot of the visual information displayed by the preferred embodiment of the present invention.

FIG. 3 is a screenshot from a video output device 20 provided in this preferred embodiment. Clearly shown in this figure are three main display segments. Video of the model performance 11 is displayed in video segment 22. Sheetmusic of the present musical composition is displayed in the sheetmusic segment 23, and a text feedback segment 24 is provided for feedback on the quality of the assessable performance 19. Additional feedback on the user's performance is also displayed by markings 25 directly displayed on each note of the sheetmusic.

Figure 4:
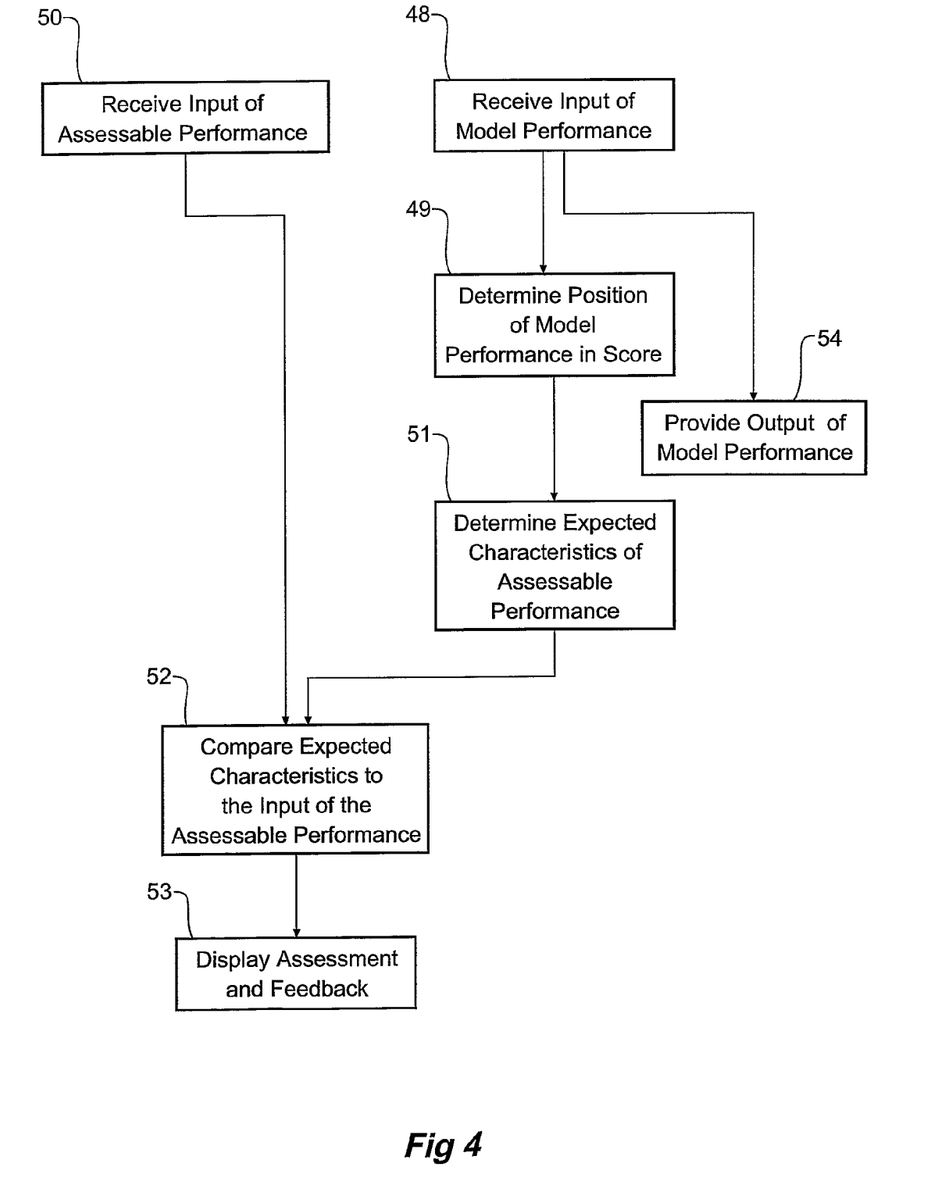
FIG. 4 outlines the method used in a preferred embodiment of the present invention.
Figure 5:
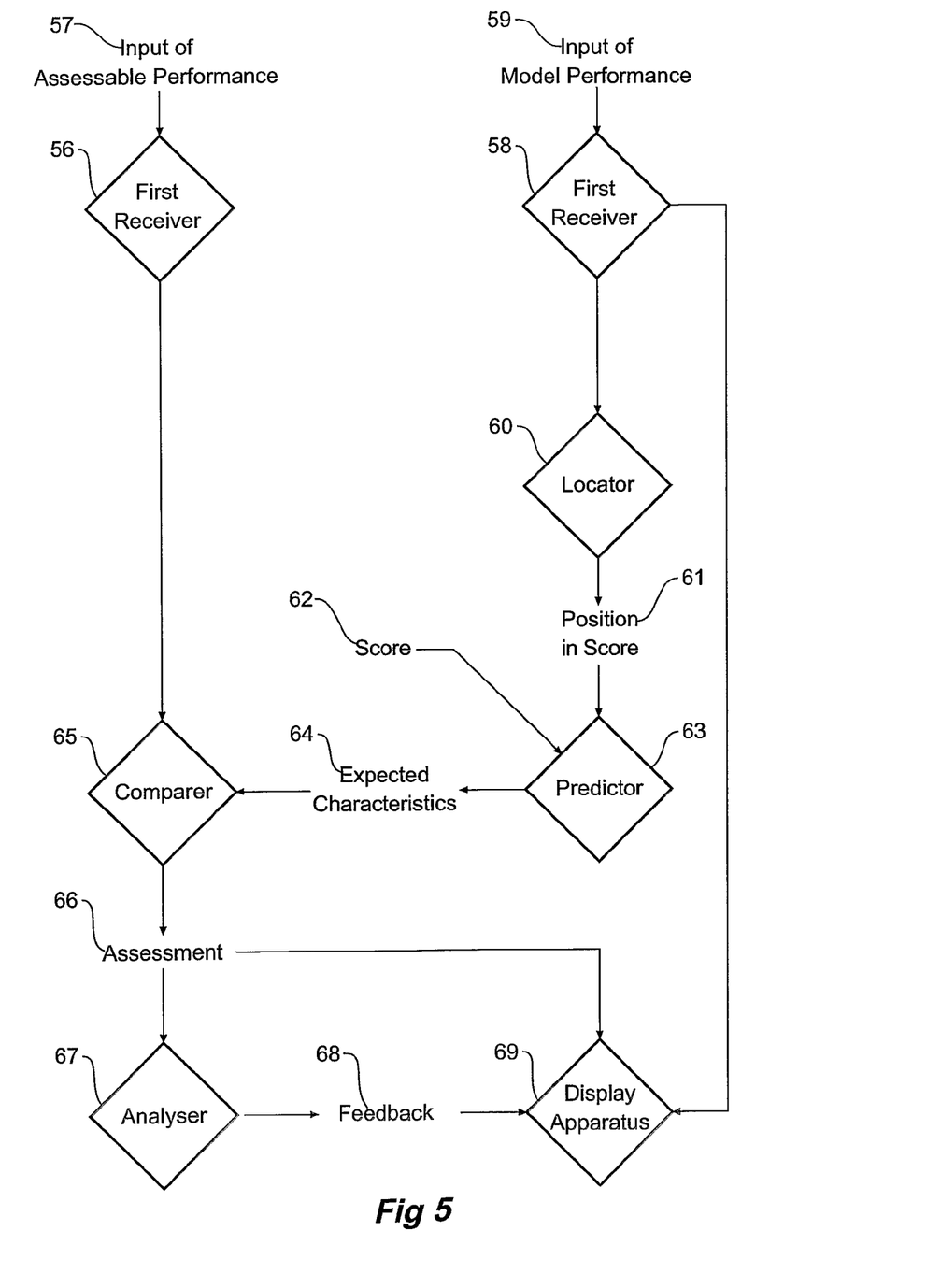
FIG. 5 is a system implementing the method of FIG. 4, according to a preferred embodiment of the present invention.
Figure 6:
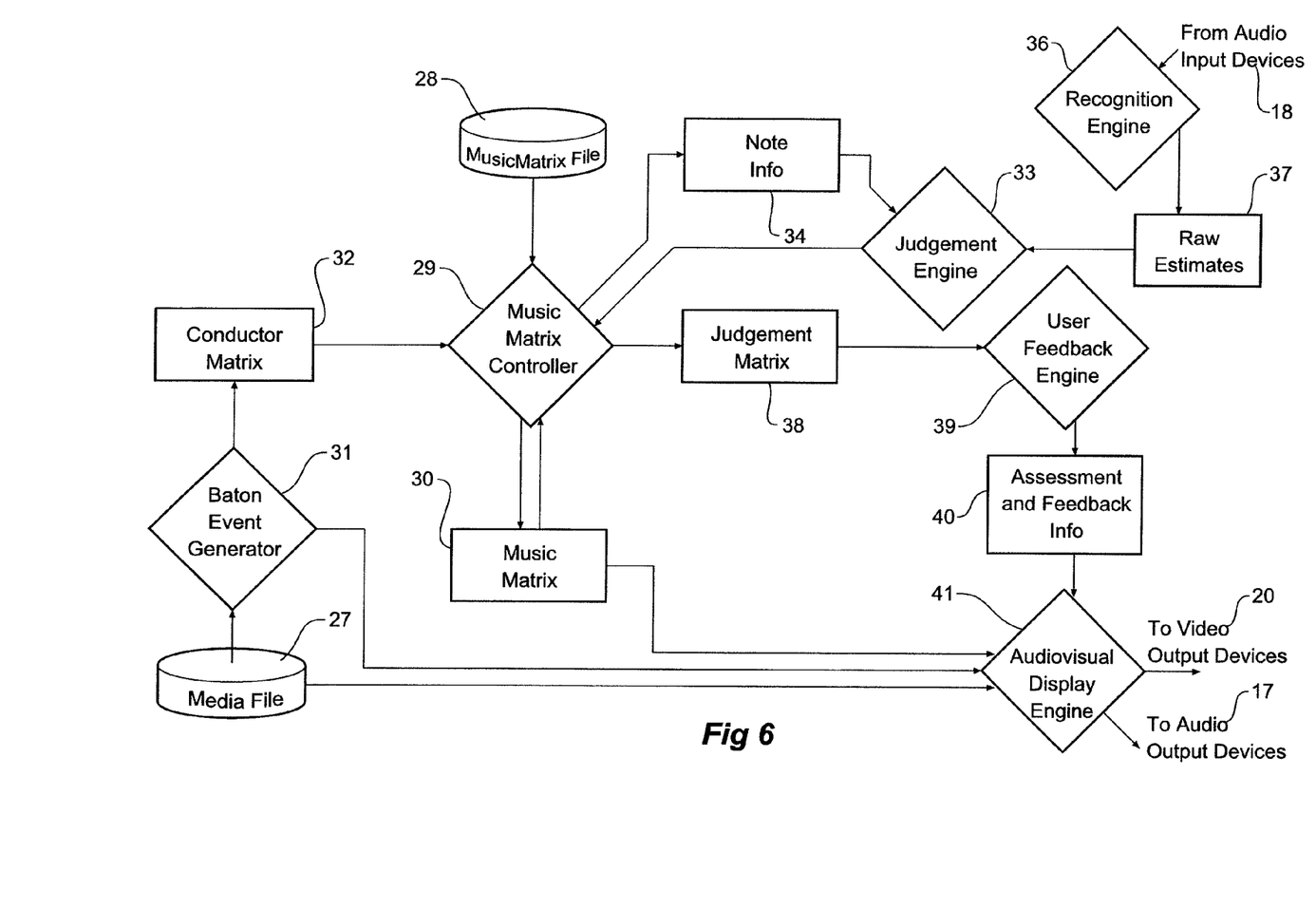
FIG. 6 is shows the system of FIG. 5 in more detail, according to a preferred embodiment of the present invention.

FIGS. 4 to 6 broadly show the operation of a system according to this preferred embodiment of the present invention, on the user's computer 16. FIG. 4 shows the steps required in order to assess the assessable performance, according to the method of this preferred embodiment of the present invention.

FIG. 5 shows the general implementation of a system for executing this method, according to a preferred embodiment of the present invention. A first receiver 56 receives input of the assessable performance 57, and a second receiver 58 receives input of the model performance 59. The received input of the model performance 59 (preferably including both audio and visual features) can be passed directly to display apparatus 69 to be displayed to the user. It is also passed to a locator 68 which determines the position 61 of the model performance in a score. If the input of the model performance 59 includes position input, then this will simply be a matter of reading the position input from the input of the model performance 59. Once the position in the score 61 is determined, a predictor 63 can reference the score 62 to determine the expected characteristics 64 of the assessable performance, which can then be compared by comparer 65 to the actual input of the assessable performance 57 to make an assessment 66. Preferably, part or all of this assessment 66, as well as feedback 68 determined by an analyser 67, is displayed by display apparatus 69.

FIG. 6 shows more specifically the implementation used in this preferred embodiment. This requires, as input, a media file 27 and a MusicMatrix file 28. The MusicMatrix file 28 is described in more detail below, and is typically downloaded prior to operation of this system. The media file 27 is typically received from the computer 14 remote from the user, and preferably includes embedded timing information. It may be provided in a streaming format, particularly if it is used to transmit the recorded performance 11 in real-time. Therefore, the following preparatory steps are required:

Creating the Media File 27 of the Model Performance 11

Input of the model performance is received by the audio and visual recording devices 12, and this input is used to generate the media file 27 containing audio and video of the model performance.

Furthermore, in this preferred embodiment, timing information is encoded into the media file. Therefore, as the model performance is received, an operator taps a key on a keyboard 13 (clearly other input devices could be used), which causes a string to be encoded into the media file 27 at the time of each beat of the model performance. Several off-the-shelf encoders are able to accomplish this, such as Windows Media Encoder. Clearly, any string could be encoded into the media file to indicate a beat occurring. For instance, simply having a beat marker at each beat, by encoding the string "Beat" in the media file 27, may suffice in many instances, such as in circumstances where the model performance begins at the start of the musical composition and follows the score directly from that point on. However, sometimes it is desirable to begin at a different point in the composition, or to repeat a section of the score in a non-standard manner. Therefore, additional information may be required—for example, if the model performance is to begin at beat 160, the string "Beat: 160" can be encoded. This is the preferred form of the beat marker, wherein the specific position of the model performance in the score is identified—i.e. the beat marker identifies the particular beat that it marks.

Clearly, other alternatives for generating this information would be possible. For example, measurements could be taken directly of the movement of a conductor's baton to ascertain when a beat occurs. However, as conductors sometimes skip beats, depending on the feel of the music, this option would be best suited only to diligent conductors.

In addition to this, other information could also be encoded. For example, for instructional purposes, it may sometimes be desirable to modify the score. Information regarding amendments to the score could therefore also be encoded—for instance, to change the second note of bar 41 to a F# 6, an instruction such as "Change:41:2 6:F#" could be encoded.

Reading a Musical Score and Storing it in Memory

Referring to FIG. 6, the Music Matrix Controller 29 exists in memory of the user's computer 16. It reads a musical score from a MusicMatrix file 28 and stores it in memory as a Music Matrix 30. The Music Matrix 30 is simply a table representing the notes to be played by a particular instrument in an orchestra for a particular composition of music. Furthermore, it contains information pertaining to the displayed sheetmusic, and timing information relating to the conducting of a particular performance of the music.

Music Matrix Definition

The Music Matrix 30 contains a list of every note to be played in the assessable performance, with specific details of how it should be performed in the context of the model performance, and also details that allow the system to display the required note. These details are the StaveX and StaveY fields described below, which are later used to assist in providing feedback to the user regarding whether any given note was played correctly (as shown in markings 25 of FIG. 3).

Clearly, the contents of the Music Matrix 20 will vary depending on the musical composition, and on the part played in the assessable performance.

The fields of the Music Matrix 30 are as follows:

| | |
|---|---|
| MeasureNum | serial number for the measure (starting from 1 at the beginning of the score) |
| CrochetDuration | duration of a crochet - arbitrary units, which set the units for all duration information |
| MeasureDuration | duration of the measure, in units |
| BeatNum | serial number of beat within each measure |
| BeatDuration | duration of a beat, in units |
| TransposeAmount | any transposition to apply to score |
| NoteNum | serial number for the note (starting from 1 at the beginning of each measure) |
| NoteDuration | duration of note, in units |
| NoteStart | start of note within bar, in units |
| NotePitch | pitch of the note, in semitones, or equivalently in Hz |
| NoteDynamics | any dynamics (volume) information in the score (e.g. pp, ff, etc) |
| StavePosition | x and y coordinates specifying the position of the note on the score image |
| NewLinePosition | y coordinate of new line of stave (to allow for scrolling of the score) |

Note that all serial numbers referred to in this document are automatically and sequentially generated from a predetermined start numeral.

MusicMatrix—XML Implementation

MusicXML is a pre-existing standard defining an XML format for music notation. MusicXML export filters are available for most commercial music notation software, making the task of generating MusicXML from existing music sources relatively easy. However, for the purposes of the current implementation, MusicXML has been modified slightly to produce the MusicMatrix format.

Whilst most of the fields of the MusicMatrix can be deduced from standard MusicXML, the indexing into the sheet music display graphics is implemented by an embedded link in the MusicMatrixXML file 28, with the x,y location specified by a target tag as follows:

```
<ITC-image> with values <X> and <Y>
<ITC-newline> with a value <y>
```

For example:

```
<ITC-image>
  <X>219</X>
  <Y>158</Y>
</ITC-image>
```

The MusicMatrix file 28 is typically downloaded prior to the media file 27 of the recording 11. However, the data contained in that file could alternatively be encoded into the media file 27 of the recording 11.

The further operation of the system on the user's computer 16 is shown broadly in FIG. 4 and is described in detail below:

Receive Input of the Model Performance (48)

In this preferred embodiment, this occurs via the computer network 15. This network may be any computer network, such as the network commonly known as the Internet. This input is received in the form of the media file 27, containing audio, video and position input (in the form of the timing information encoded into the media file).

Determine the Position of the Model Performance 11 in the Score (49)

The Baton Event Generator 31 reads the media file 27 received by the user's computer 16. When it reads the embedded timing information, the Baton Event Generator 31 generates a BatonEvent which is stored in a Conductor Matrix 32. Each BatonEvent contains the following information:

| | |
|---|---|
| BeatNum | serial number of the beat |
| BeatTime | time of this beat in the media file |
| BeatTiming | time since the previous beat. |

BeatNum is preferably generated from the beat marker embedded in the Media File 27 and this identifies the position of the model performance in the score.

As previously discussed, if it is not feasible to embed this information directly into the Media File 27, it could be contained within a separate data file associated with the recording. This file will contain the information required by the Conductor Matrix 32.

In another alternative, no timing information could be encoded. In this circumstance, the model performance 11 itself could be analysed—it would be possible (although in some ways more difficult) to determine the location in the score simply by matching the notes of the model performance to the corresponding notes in the score.

Of course, it is generally inaccurate to determine the position of the model performance 11 in the score purely by using a timer from the beginning of the model performance 11. As those skilled in the art would be well aware, no two performances of a composition are ever the same. A model performance—for example by an orchestra—will generally vary to some degree from the precise tempo assigned by the score.

Determining the Expected Characteristics of the Assessable Performance, for the Played Part (51)

When a BatonEvent is generated and written to the Conductor Matrix 32, the Music Matrix Controller 29 finds the corresponding MeasureNum and BeatNum in the Music Matrix 30 and extracts the notes and note timings for the previous beat. By evaluating the timing of each note in the Music Matrix, in relation to the temporal pattern of BatonEvents 31, the controller is able to assign a predicted duration in seconds to each of the expected notes of the previous beat, and a predicted start time to each of those notes. Other characteristics, such as the pitch of the note, are prescribed by the score and contained within the Music Matrix 30. Therefore, the expected characteristics of each note (Note Info 34) can be determined and provided to the judgement engine.

These expected characteristics preferably include at least:
the expected note pitch;
the expected note start time; and
the expected note duration.

The expected duration of the note is generated using the following formula:

ExpectedDuration=(NoteDuration/BeatDuration)*BeatTiming

This relationship translates the time value of a note on the score (NoteDuration) into a value described in milliseconds. The BeatTiming is generated based on the time between the present BeatEvent and the previous BeatEvent.

Receiving Input of the Assessable Performance (50)

The Recognition Engine 36 receives input of the assessable performance 19 via audio input device 18, generally as the user plays a part of the musical composition, and provides a sequence of estimates (RawEstimates 37) to the Judgement Engine 33 about characteristics of the assessable performance 19, such as the current pitch, volume, and timbre. The frequency of estimates can be varied depending on the instrument and style of music played, in order to get the most accurate results. Taking estimates more often may result in less accurate readings by the Recognition Engine 36. On the other hand, if the musical composition is played at a fast pace, taking fewer estimates may result in little or no information being obtained for some notes, particularly those notes of short duration. Currently, taking estimates at a rate of 40 per second has been found to be a widely useful rate. However, in general, using faster rates for faster musical pieces and slower rates for slower pieces would be a better alternative, and this rate may in other embodiments be dynamically changed.

The RawEstimates 37 are stored in memory in the following format:

| | |
|---|---|
| Raw Pitch Num | an ID assigned to the current estimate |
| Confidence | measure of confidence in the pitch estimate, as determined by the Recognition Engine; confidence is a function of the timbre of the performance |
| Loudness | estimated loudness of the sound, in decibels |
| Times | the time at which this pitch estimate was obtained, in seconds since the start of operation |
| Voiced | whether not silent |
| pitch | estimated pitch frequency, in Hz |

Comparing the Expected Characteristics of the Assessable Performance to the Input of the Assessable Performance to Make an Assessment (52)

At each BeatEvent, the Judgement Engine 33 compares the expected characteristics (as provided by the NoteInfo 34) to the RawEstimates 37 for at least the previous beat. An assessment can be made from this comparison, and details of the assessment along with the X,Y coordinates of the assessed note are then presented to the Music Matrix Controller 29, which stores them in the Judgement Matrix 38.

The information stored in the Judgement Matrix 38, based on the assessment of the Judgement Engine 33, includes the following parameters:

| | |
|---|---|
| JudgementPitch | assessment of the played pitch (correct, low, high, undetermined) |
| JudgementLoudness | assessment of the played loudness (correct, low, high, undetermined) |
| JudgementDuration | assessment of the played duration (correct, low, high, undetermined) |
| PlayedPitch | actual pitch (in Hz) as played |
| PitchError | error between played and specified pitch, in semitones |
| Confidence | confidence estimate of the pitch judgement |
| PlayedDynamic | actual loudness of played note |
| PlayedDuration | actual duration of played note |

An assessment on the timing of the assessable performance can be made immediately on notes that are too short. However timing assessments relating to notes that are too long or that have been played completely out of time are judged by comparing the RawEstimates 37 to the expected characteristics (as provided by the NoteInfo 34) over a longer period of time.

Figure 7:
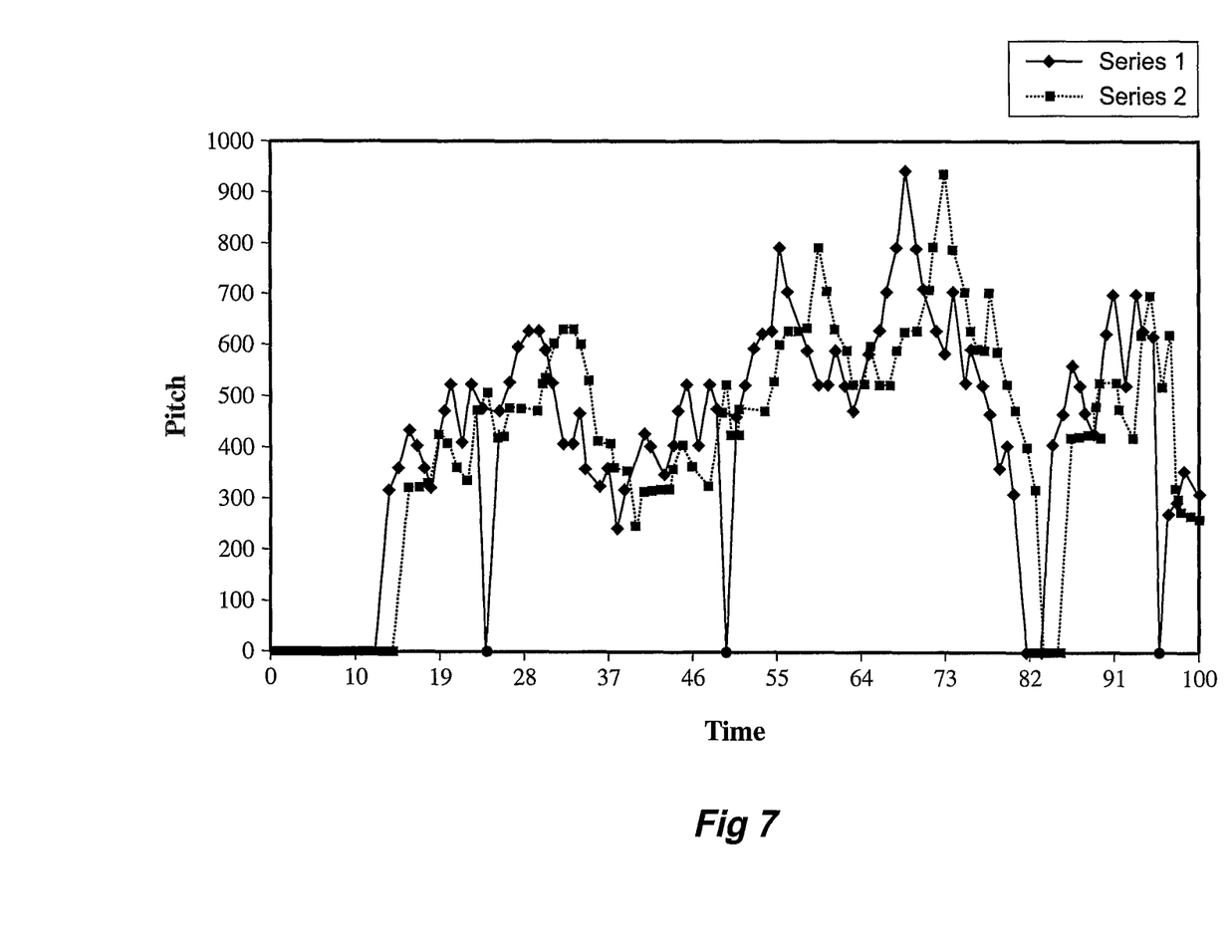
FIG. 7 is a graph comparing pitch judgements provided by a frequency recognition engine to the expected pitches, over time.

FIG. 7 shows a comparison between the expected characteristics (Series 1), and the RawEstimates 37 from the recognition engine (Series 2), for an assessable performance 19, over time. In the example in FIG. 4, it can be seen that the user is generally later than expected, and plays several notes incorrectly.

Several display features are possible, to improve the usefulness of the system to the user:

Display the Score to the User

The MusicMatrix 30 contains all the information of the score, including how to display it on a stave, and the conductor matrix contains information as to where in the score the model performance 11 currently is. Therefore, it is possible to ensure that the correct portion of the score is displayed to the user as they play along with the model performance 11.

Providing Output of the Model Performance (54)

As the present invention is best used to allow a musician (generally the user), when performing an assessable performance 19, to play along with a model performance 11, it is desirable to provide output of the model performance 11 as the musician performs the assessable performance 19. For example, where the model performance 11 is performed by an orchestra, it is possible to give the musician the feeling that they are part of the orchestra, by providing both audio and visual output of the model performance 11.

Displaying the Assessment and, if Appropriate, Providing the User with Feedback (53)

The User Feedback Engine 39 generates assessment and feedback information (Assessment and Feedback Info 40) which is passed to the Audiovisual Display Engine 41.

The Assessment and Feedback Info 40 specifies the information to be displayed, which can be incorporated into the output of the video 20 and audio 17 output devices. The Audiovisual Display Engine 41 will typically already be sending audio and/or video of the performance 11 as provided in media file 29 to the output devices 17, 20. Typical video output from the Audiovisual Display Engine 41 is shown in the screenshot of FIG. 3.

Figure 8:
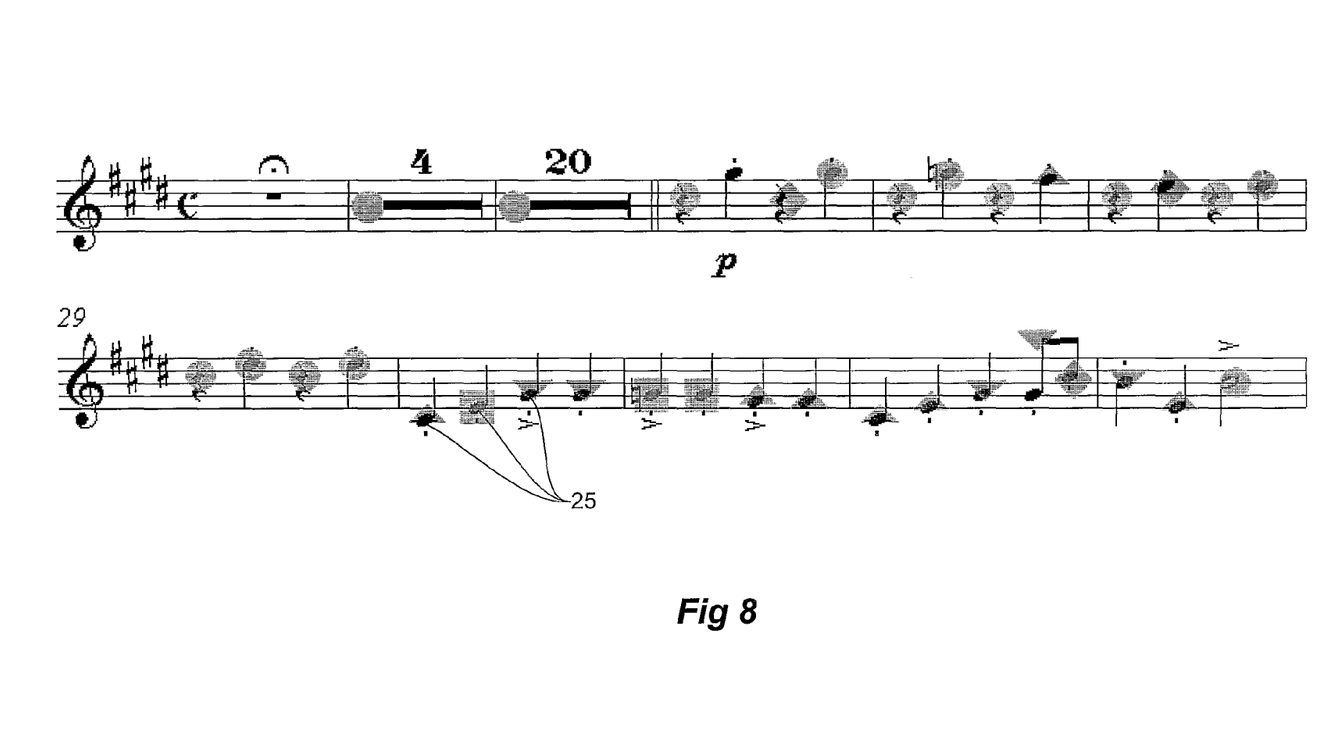
FIG. 8 is an example of the assessment as displayed by a preferred embodiment of the present invention.

Assessment and feedback information 40 can be provided to the user by the Audiovisual Display Engine 41 in the following formats:
  (a) symbols superimposed onto the score. FIGS. 3 and 8 give examples of symbols 25 rendered onto the score.
  (b) text or symbols describing the errors by type (e.g. pitch, volume, timing or timbre) and by measure (bar and notation number). FIG. 3 shows text in the text feedback display segment 24 of the user display.
  (c) recorded voice messages which respond to a successful performance by giving encouragement or an error by helping to correct it.

It would also be possible to include a recording facility to allow the user to play back the assessable performance 19, along with a recording of the model performance 11. The user could then analyse in more detail both their own performance 19 and the assessment and feedback information 40 provided by the system.

Although a preferred embodiment of the present invention has been described in the foregoing detailed description, it will be understood that the invention is not limited to the embodiment disclosed, but is capable of numerous rearrangements, modifications and substitutions without departing from the scope of the invention. Modifications and variations such as would be apparent to a skilled addressee are deemed within the scope of the present invention.

The claims defining the invention are as follows:

1. A method for assessing an assessable performance of a played part of a musical composition by a musician, comprising:
  receiving audio input of a model performance of one or more parts of the musical composition;
  receiving input of computer-readable score data separately from said receiving audio input of the model performance;
  correlating the model performance, the model performance and the assessable performance being performed by different musicians, with a corresponding position of the score data of at least the played part of the musical composition, such that when the assessable performance is played in time with the model performance, the assessable performance is favorably assessed, even when at least part of the model performance is not played in tempo with a tempo prescribed by the score;
  receiving input of the assessable performance;
  determining, from the score data, one or more expected characteristics of the assessable performance based on the corresponding position of the score data, for the played part; and
  comparing at least one of the one or more expected characteristics to corresponding characteristics of the input of the assessable performance to make an assessment of the assessable performance.

2. The method of claim 1, further comprising:
  providing an output of the model performance to the musician as the assessable performance is performed.

3. The method of claim 1, wherein further comprising:
  receiving a visual input of the model performance, and providing visual output of the model performance to the musician as the assessable performance is performed.

4. The method of claim 1, wherein the assessment comprises an assessment regarding a timing of the assessable performance relative to the model performance.

5. The method of claim 1, further comprising:
  displaying the assessment.

6. The method of claim 5, wherein the assessment is displayed to the musician.

7. The method of claim 1, wherein the model performance and the assessable performance are remote from each other in time or space.

8. The method of claim 1, wherein the model performance and the assessable performance are remote from each other in space.

9. The method of claim 8, wherein the model performance and the assessable performance occur together in real-time.

10. The method of claim 8, wherein the input of the model performance is received via a network of computers.

11. The method of claim 1, further comprising receiving, with the audio input of the model performance, a position input that identifies the corresponding position of the score.

12. The method of claim 11, wherein the position input comprises beat markers for beats of the musical composition.

13. The method of claim 12, wherein the beat markers are encoded within the audio input of the model performance.

14. The method of claim 11, wherein the position input comprises beat markers for each beat of the musical composition.

15. The method of claim 1, further comprising:
  providing feedback to the musician of how their playing could be improved, based on the assessment.

16. The method of claim 15, wherein the feedback is provided in an audio, a text or a graphical format.

17. A computer readable medium, encoded with data representing a computer program, that when executed by a computer programmable device is used to direct the programmable device to perform the method of claim 1.

18. A computer program element comprising a computer readable medium having encoded data thereon representing a computer program code that when executed by the computer program element makes a programmable device execute the method of claim 1.

19. The method of claim 1, wherein the timing of the model performance varies, at least in part, from the score data.

20. The method of claim 1, further comprising:
displaying the score data to the musician, as sheetmusic, for the musician to follow while performing the assessable performance.

21. The method of claim 1, wherein the audio input of the model performance is received from a media file.

22. The method of claim 21, wherein the media file is a pre-recorded media file of the model performance.

23. A system for assessing an assessable performance of a played part of a musical composition by a musician, comprising:
a first receiver that receives an input of the assessable performance;
a second receiver that receives an audio input of a model performance of the musical composition;
a third receiver that receives input of computer-readable score data separately from said receiving audio input of the model performance;
a correlator that correlates the model performance, the model performance and the assessable performance being performed by different musicians, with a corresponding position of the score data of at least a played part of the musical composition, such that when the assessable performance is played in time with the model performance, the assessable performance is favorably assessed, even when at least part of the model performance is not played in tempo with a tempo prescribed by the score, using the input received by the second receiver;
a predictor that determines, from the score data, at least one expected characteristic of the assessable performance, based on the corresponding position of the score data, for the played part; and
a comparer that compares at least one characteristic of the input of the assessable performance to corresponding expected characteristics to make an assessment of the assessable performance.

24. The system of claim 23, further comprising an analyzer that analyzes the assessment to provide feedback on how the musician's playing can be improved.

25. The system of claim 23, further comprising a display apparatus that displays at least one of:
the assessment; and
an output of the model performance, from the audio input received by the second receiver.

26. The system of claim 24, further comprising a display apparatus that displays at least one of:
the assessment;
the feedback; and
an output of the model performance, from the audio input received by the second receiver.

27. The system of claim 25, wherein the display apparatus enables an audio output and a video display.

28. The system of claim 23, wherein the timing of the model performance varies from the score.

\* \* \* \* \*